US008054746B2

(12) United States Patent
Ozugur et al.

(10) Patent No.: US 8,054,746 B2
(45) Date of Patent: Nov. 8, 2011

(54) RESOURCE USAGE MEASUREMENT TECHNIQUE FOR PRICING IN A COMMUNICATIONS NETWORK

(75) Inventors: Tim Ozugur, Garland, TX (US); Kazem Anaraky Sohraby, Lincroft, NJ (US); On-Ching Yue, Middletown, NJ (US)

(73) Assignee: Alcatel Lucent, Paris (FR)

( * ) Notice: Subject to any disclaimer, the term of this patent is extended or adjusted under 35 U.S.C. 154(b) by 1982 days.

(21) Appl. No.: 10/115,519

(22) Filed: Apr. 2, 2002

(65) Prior Publication Data

US 2002/0150054 A1    Oct. 17, 2002

Related U.S. Application Data

(63) Continuation of application No. 09/220,723, filed on Dec. 24, 1998, now abandoned.

(51) Int. Cl.
*H04L 12/26* (2006.01)
*H04M 15/00* (2006.01)

(52) U.S. Cl. ............... 370/232; 370/252; 379/112.06

(58) Field of Classification Search .......... 370/232, 370/233, 234, 241, 252, 253; 379/111, 112.01, 379/112.06–112.08, 114.01, 114.03, 114.08, 379/133, 134
See application file for complete search history.

(56) References Cited

U.S. PATENT DOCUMENTS

| | | | | |
|---|---|---|---|---|
| 5,301,122 A | * | 4/1994 | Halpern | 702/62 |
| 5,317,570 A | * | 5/1994 | Ochiai | 370/234 |
| 5,664,006 A | * | 9/1997 | Monte et al. | 455/405 |
| RE35,793 E | * | 5/1998 | Halpern | 364/483 |
| 5,761,091 A | | 6/1998 | Agrawal et al. | 702/186 |
| 5,774,530 A | | 6/1998 | Montgomery et al. | 379/112.01 |
| 5,809,120 A | | 9/1998 | Montgomery et al. | 379/114.06 |
| 5,854,835 A | | 12/1998 | Montgomery et al. | 379/112.06 |
| 5,859,899 A | * | 1/1999 | Sakai et al. | 379/92.01 |
| 5,872,771 A | * | 2/1999 | Park et al. | 370/252 |
| 6,073,174 A | | 6/2000 | Montgomerie et al. | 709/224 |
| 6,086,618 A | | 7/2000 | Al-Hilali et al. | 703/2 |

(Continued)

OTHER PUBLICATIONS

Zheng, Y. and Feng, Z. A New Active Queue Management Algorithm Based on the Rate and Burstiness Estimation. 2002 IEEE.*

(Continued)

*Primary Examiner* — Gregory Sefcheck
(74) *Attorney, Agent, or Firm* — Ryan, Mason & Lewis, LLP (57) ABSTRACT

A method and apparatus are disclosed for measuring the usage of a communications network, based on a two level sampling and measuring technique. A sampling interval, T, represents the intervals at which the network resource is observed. In addition, during each sampling interval, a measurement window of length, τ, is utilized. Generally, while the values for the sampling interval, T, and the measurement window, τ, are calibrated, actual measurements are only taken for the smaller measurement window, τ, and the actual measurements are extrapolated to estimate the usage over the larger sampling interval, T. The sampling interval, T, and measurement window, τ, values may be periodically recalibrated. An extrapolation process consists of two phases: (i) a "learning period" (LP) during which both exact and extrapolated measurements are performed, the error is determined, and, if necessary, adjustments are made to the values of the sampling interval, T, and the measurement window, τ; and (ii) a "measurement and extrapolation period" (MEP) during which only measurements during the sampling interval, T, continue and the sampled measurements are extrapolated without performing the exact measurements. Several learning periods, LPs, may be interleaved during a communication session with larger measurement and extrapolation period, MEP, intervals.

19 Claims, 8 Drawing Sheets

U.S. PATENT DOCUMENTS

| | | | | |
|---|---|---|---|---|
| 6,094,418 | A * | 7/2000 | Soumiya et al. | 370/231 |
| 6,185,439 | B1 * | 2/2001 | Guerrero et al. | 455/560 |
| 6,201,791 | B1 * | 3/2001 | Bournas | 370/234 |
| 6,223,041 | B1 * | 4/2001 | Egner et al. | 455/452.2 |
| 6,230,204 | B1 * | 5/2001 | Fleming, III | 709/229 |
| 6,295,294 | B1 * | 9/2001 | Odlyzko | 370/389 |
| 6,327,247 | B1 * | 12/2001 | Naudts | 370/232 |
| 6,335,591 | B1 * | 1/2002 | Hirao et al. | 313/484 |
| 6,356,628 | B1 * | 3/2002 | Burke et al. | 379/112.06 |
| 6,359,863 | B1 * | 3/2002 | Varma et al. | 370/232 |
| 6,377,550 | B1 * | 4/2002 | Prasad | 370/236.1 |
| 6,415,368 | B1 * | 7/2002 | Glance et al. | 711/158 |
| 6,449,350 | B1 * | 9/2002 | Cox | 379/134 |
| 6,493,547 | B1 * | 12/2002 | Raith | 455/405 |
| 6,535,591 | B1 * | 3/2003 | Galich et al. | 379/112.06 |
| 6,560,204 | B1 * | 5/2003 | Rayes | 370/253 |

OTHER PUBLICATIONS

Cheng, G. and Gong, J. Traffic Behavior Analysis with Poisson Sampling of High-Speed Network. 2001 IEEE.*

Ozegovic, J. Window-Time-Space Flow Control (WTFC). 1998 IEEE.*

Courcoubetis et al., "A Study of Simple Usage-Based Charging Schemes for Broadband Networks," Technical Report No. 193, ICS-FORTH, www.ics.forth.gr/netgroup/publications (May 1997).

Courcoubetis et al., "Measurement-Based Charging in Communications Networks," Technical Report 1997-19, Statistical Laboratory, University of Cambridge (1997).

Courcoubetis et al., "An Evaluation of Pricing Schemes That Are Based On Effective Usage," Technical Report No. 214, ICS-FORTH, www.ics.forth.gr/netgroup/publications (Feb. 1998).

Courcoubetis et al., "An Approach to Pricing and Resource Sharing for Available Bit Rate (ABR) Services," Technical Report 212, ICS-FORTH, www.ics.forth.gr/netgroup/publications (Nov. 1997).

Lin et al., "On the Placement of Web Proxies in the Internet: The Linear Topology," High Performance Networking, Klumer Academic Publishers, pp. 485-495 (1998).

* cited by examiner

| SOURCE/ DEST. ADDRESS | T | τ | ε* | EXTRAPOLATED NO. OF PACKETS | ENDING TIME OF LAST (LP) | LENGTH OF LP | LENGTH OF MEP | TIME OF LAST INACTIVITY |
|---|---|---|---|---|---|---|---|---|
| A | | | | | | | | |
| A | | | | | | | | |
| A | | | | | | | | |
| ... | | | | | | | | |

FIG. 7

RESOURCE USAGE MEASUREMENT TECHNIQUE FOR PRICING IN A COMMUNICATIONS NETWORK

CROSS REFERENCE TO RELATED APPLICATIONS

This application is a continuation of application Ser. No. 09/220,723, filed Dec. 24, 1998 now abandoned.

FIELD OF THE INVENTION

The present invention relates to a network communication system, and more particularly, to a method and apparatus for measuring the usage of a communications network.

BACKGROUND OF THE INVENTION

In a communications network, such as an ATM network or the Internet, users should be charged for use of the network based on the amount of network resources utilized. The network resources that are consumed for each network connection include a number of processing cycles at various network processors, such as the routers or call processors of switching equipment or bandwidth usage on transmission facilities, as well as overhead services required to operate the networks, such as operations, maintenance and administration. Generally, costs associated with such overhead services are included in the total network capital, then pro-rated and amortized before being applied to individual users.

Typically, resource usage is measured in terms of the number of units of information that are sent and received by the user during a given connection and the duration of the connection. These measures provide an appropriate basis for charging a user since they represent the amount of processing performed by the network and the amount of bandwidth consumed by the network. Measuring resource usage by counting the number of units of information that is exchanged and possibly the connection time is an exact method but requires large processing power, especially for broadband networks having transmission rates in the range of several gigabits per second or higher.

In addition to the pricing of network usage, resource measurement also has important applications for short-term and long-term network planning, where the allocation and adjustment of network resources is of concern. Furthermore, resource measurements may also help develop accurate models for real-time control and management of networks, such as for quality of service control, call admission, resource usage management, distribution and control.

The bandwidth requirements of network applications vary significantly, from applications having relatively low requirements, such as telemetry and voice, to applications with much higher bandwidth requirements, such as video and large file transfers. Users of the World Wide Web (WWW), for example, access web servers for information. Such web server accesses result in one or more exchanges between web proxies and servers and the end user client machine until the original user request is satisfied.

Recent networking techniques advocate the "participation" of network routers and switches in applications, thus going beyond the traditional transmission of information units between end users and computers. For example, B. Li et al., "On the Optimal Placement of Web Proxies in the Internet," Proc. of the 8th IFIP Conf. on High Performance Networking (HPN'98), Vienna, Austria (September 1998), suggests that processing and applications be included in Internet routers (or in servers and proxies co-located with routers) optimally distributed over the network. For applications that are frequently accessed by the end users, such as stock quotes and on-line auctions, D. Wetherall et al., "Introducing New Internet Services: Why and How," IEEE Network Magazine (July/August 1998), suggests distributing such applications at the routers/servers (or at servers/proxies).

A number of statistical methods have been proposed or suggested for measuring the usage of a communications network. A technique for measuring the usage of a communications network based on equivalent bandwidth was proposed, for example, in C. Courcoubetis et al., "A Study of Simple Usage-Based Charging Schemes for Broadband Networks," submitted August, 1998. While these measurement techniques may be adequate for current network applications, new methods for measuring the usage of a communications network are needed as the speed and diversity of applications increase and less is known about the effective bandwidth of new applications.

For example, applying the equivalent bandwidth measurement technique in an ATM network for real-time video conferencing between end users, accurately measures network resources as long as statistical characteristics of the video traffic is properly represented in the equivalent bandwidth model. The equivalent bandwidth measurement technique may not work, however, on the Internet, where a mix of text, audio and video clips are obtained from one or more web servers following a search and less is known about their statistical characteristics. The mix of such entities, and the bandwidth and processing that are required to deliver such entities to the end user, vary based on the application, the type of search (such as research, informational or entertainment), and the time of day when the search is performed. For example, searches performed during periods of time when the network is experiencing congestion may not last as long as searches performed when there is relatively little or no congestion. Thus, it is hard for users and service providers to predict the bandwidth and other resource needs ahead of a connection.

SUMMARY OF THE INVENTION

Generally, a method and apparatus are disclosed for measuring the usage of a communications network, based on a two level sampling and measuring technique. A sampling interval, T, represents the intervals at which the network resource is observed. In addition, during each sampling interval, a measurement window of length, $\tau$, is utilized. Generally, while the values for the sampling interval, T, and the measurement window, $\tau$, are calibrated, actual measurements are only taken for the smaller measurement window, $\tau$, and the actual measurements are extrapolated to estimate the usage over the larger sampling interval, T. The sampling interval, T, and measurement window, $\tau$, values may be periodically recalibrated.

In one implementation, an extrapolation process consists of two phases: (i) a "learning period" (LP) during which both exact and extrapolated measurements are performed, the error is determined, and, if necessary, adjustments are made to the values of the sampling interval, T, and the measurement window, $\tau$; and (ii) a "measurement and extrapolation period" (MEP) during which only measurements during the sampling interval, T, continue and the sampled measurements are extrapolated without performing the exact measurements. Several learning periods, LPs, may be interleaved during a communication session with larger measurement and extrapolation periods, MEPs.

An illustrative calibration and extrapolation process is disclosed that calibrates the values of the sampling interval, T, and the measurement window, τ. During an initial learning period, $LP_0$, an initial value for the sampling interval, $T_0$, and the measurement window, $τ_0$, are selected. The number of units, $m_0$, are measured over the sampling interval, $T_0$, and the measurement window, $τ_0$. In addition, the total number of packets, m', over the sampling interval, T, is extrapolated from the number of units, $m_0$, measured during the initial measurement window, $τ_0$, using the expression:

$$m' = \frac{T_0}{τ_0} \times m_0 \quad \text{Eq. (2)}$$

An error, ε, value is obtained to evaluate the initial sampling interval, T, and the measurement window, τ, settings using the expression:

$$ε = \left| \frac{M^0 - M'}{M^0} \right| \quad \text{Eq. (3)}$$

where $M_0$ represents the actual number of units over each measurement window in the initial learning period, $LP_0$, and M' represents the total extrapolated value.

If the error, ε, is less than or equal to an acceptable error in measurement, ε*, then the process of exact measurement and extrapolation during the initial learning period, $LP_0$, is halted and only extrapolation from measurements over the measurement and extrapolation periods, MEPs, continue.

If the error, ε, is not less than or equal to an acceptable error in measurement, ε*, then the calibration process attempts to reduce the error by varying the initial sampling interval, T, or the measurement window, τ (or both). In the illustrative embodiment, the measurement window, τ, is initially increased. The error is then recalculated, and if the error is still not sufficiently reduced (to below ε*), then the initial sampling interval, $T_0$, is reduced.

A more complete understanding of the present invention, as well as further features and advantages of the present invention, will be obtained by reference to the following detailed description and drawings.

DETAILED DESCRIPTION

Figure 1:
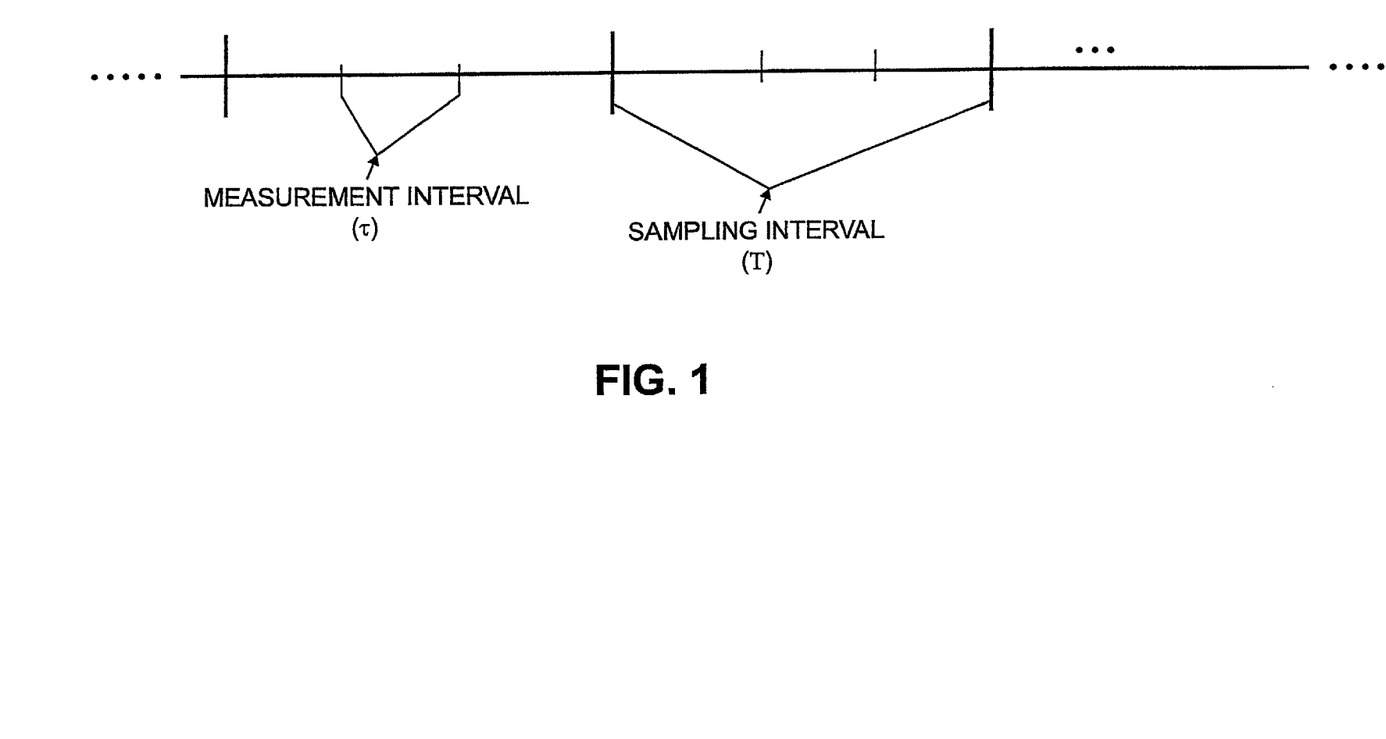
FIG. 1 illustrates the sampling and measurement intervals for measuring network usage in accordance with the present invention.

The present invention measures the usage of a communications network based on a two level sampling and measuring technique, over sampling and measurement intervals, respectively. As shown in FIG. 1, the sampling interval, T, represents the intervals at which the network resource is observed. In addition, during each sampling interval, a measurement window of length, τ, is utilized. As discussed further below, the sampling interval can be fixed or can vary depending on the type of application and the resources that are measured. For example, for a communications link used for a video teleconference lasting several hours, the sampling interval, T, may be on the order of seconds, or minutes. On the other hand, for a server processor, the sampling interval, T, may be on the order of seconds, or milliseconds.

The position of the measurement window, τ, in the sampling interval, T, can be fixed or can vary depending on the type of application. The size of measurement window, τ, varies based on the sampling interval, T, and the application type. For example, for a communications link used for a video teleconference lasting several hours, where the sampling interval, T, is on the order of minutes, the measurement window, τ, may be on the order of seconds or even milliseconds. In the case of a processor measurement where the sampling interval, T, is on the order of tens of milliseconds, the measurement window, τ, may be chosen on the order of a few milliseconds or smaller. The values of the sampling interval, T, and the measurement window, τ, may be established based on experimental results.

It is noted that both the sampling and measurement intervals may remain fixed for the duration of a measurement process. For example, after several sampling intervals if it is determined that the resource usage measured by this technique is constant or almost constant, the interval may be increased accordingly since no major changes are expected. Similarly, the same sampling interval can be maintained with reduced measurement intervals. However, when the measurement values over the sampling interval, T, reveal large differences between past measurements, then the measurement window, τ, can be increased or the sampling interval, T, can be reduced.

According to one feature of the present invention, a range of acceptable error, ε*, is defined for evaluating the measured usage versus the actual usage. The error, ε, between the exact and extrapolated measurement is:

$$ε = \left| \frac{m_0 - m'}{m_0} \right| \quad \text{Eq. (1)}$$

where $m_0$ represents the actual number of units over a measurement window and m' represents the number of units over the measurement window, τ, extrapolated over the sampling interval, T. It is noted that m' may be equal to, greater than or smaller than $m_0$.

Figure 2A:
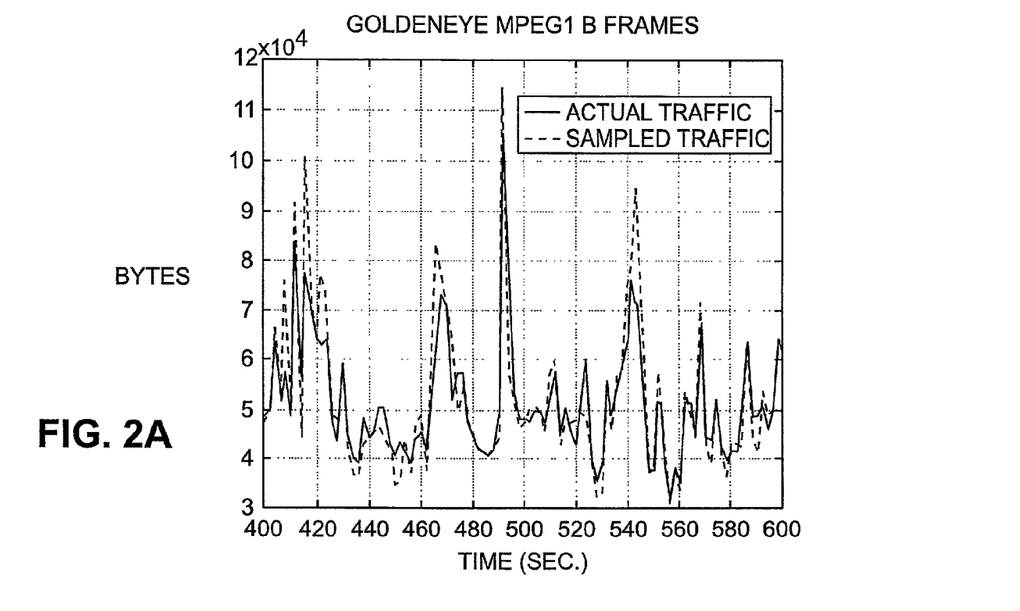
FIGS. 2A and 2B illustrate the cumulative error between the exact and the extrapolated measurement for a sample video clip, where the sampling interval, T, was 2 seconds, and the measurement window, τ, was 100 milliseconds.
Figure 2B:
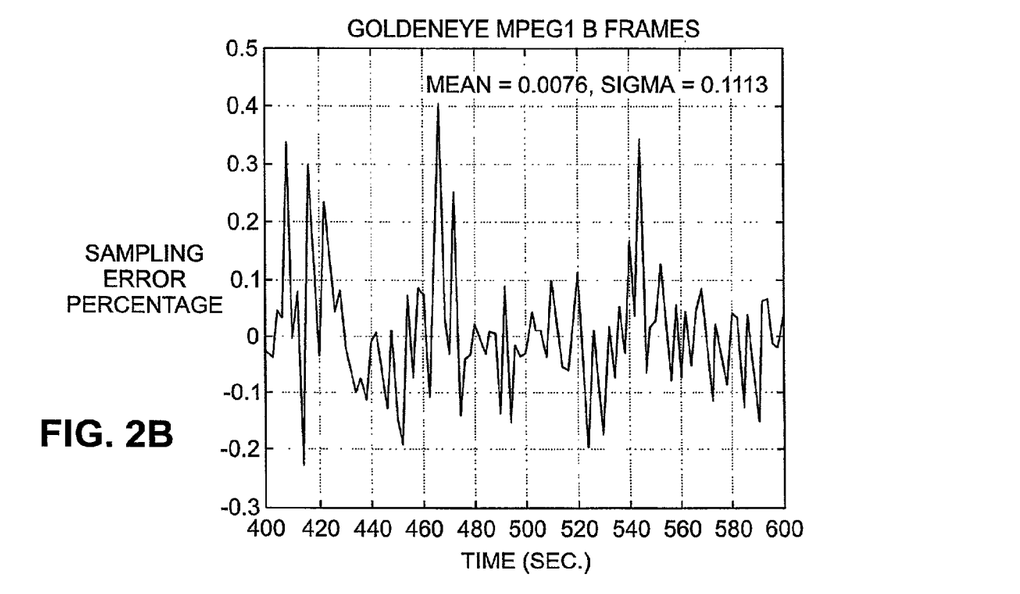

In measuring the number of units, during some measurement windows, τ, the count from which extrapolation over the entire sampling interval, T, is done may be less than, greater than, or equal to the exact number of units. As a result, a cumulative count of such units may over-estimate or under-estimate the actual value. FIGS. 2A and 2B illustrate the cumulative error between the exact and the extrapolated measurement for a video clip, where the sampling interval, T, was 2 seconds, and the measurement window, $\tau$, was 100 milliseconds. FIG. 2A illustrates the actual and sampled traffic for a video clip and FIG. 2B illustrates the sampling error percentage (the error between the actual and sampled traffic), where the total sampling error is only 0.0162.

When the sampling interval, T, and the measurement windows, $\tau$, are used for the pricing of network resource usage, among other applications, it is submitted that the under- or over-estimated values of equal magnitude cancel each other. In this case the error indicated in Equation 1 would accurately represent the error committed in measurements, such as for pricing. It is noted that the error, $\epsilon$, depends on the values of the sampling interval, T, and the measurement window, $\tau$.

Figure 3:
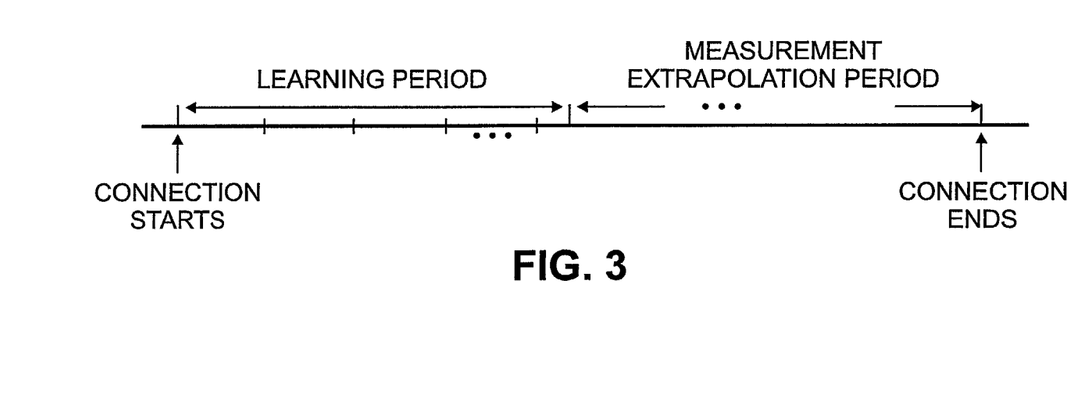
FIG. 3 illustrates the two phases of the extrapolation process in accordance with the present invention, where the learning period preceeds the measurement and extrapolation period.
Figure 4:
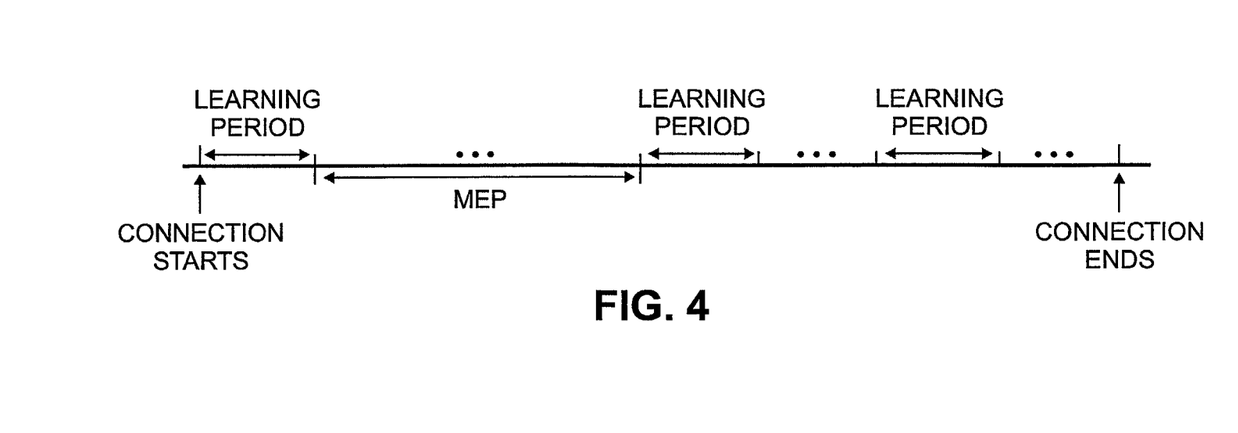
FIG. 4 illustrates the interleaving of several learning periods, LPs, during a communication session with larger measurement and extrapolation periods, MEPs.

As shown in FIG. 3, the extrapolation process consists of two phases: (i) a "learning period" (LP) during which both exact and extrapolated measurements are performed, the error is determined, and, if necessary, adjustments are made to the values of the sampling interval, T, and the measurement window, $\tau$; and (ii) a "measurement and extrapolation period" (MEP) during which only measurements during the sampling interval, T, continue and the sampled measurements are extrapolated without performing the exact measurements. As shown in FIG. 4, several learning periods, LPs, may be interleaved during a session with larger measurement and extrapolation period, MEP, intervals. A learning period, LP, that is expected to last a short period of time compared with the total length of a connection and the measurement and extrapolation period, MEP, intervals, is used to calibrate (and re-calibrate) the initial sampling interval, T, and measurement window, $\tau$. During the learning period, LP, the measurement window, $\tau$, and the sampling interval, T, are adjusted so that the error, $\epsilon$, remains below an acceptable error in measurement, $\epsilon^*$.

Figure 5A:
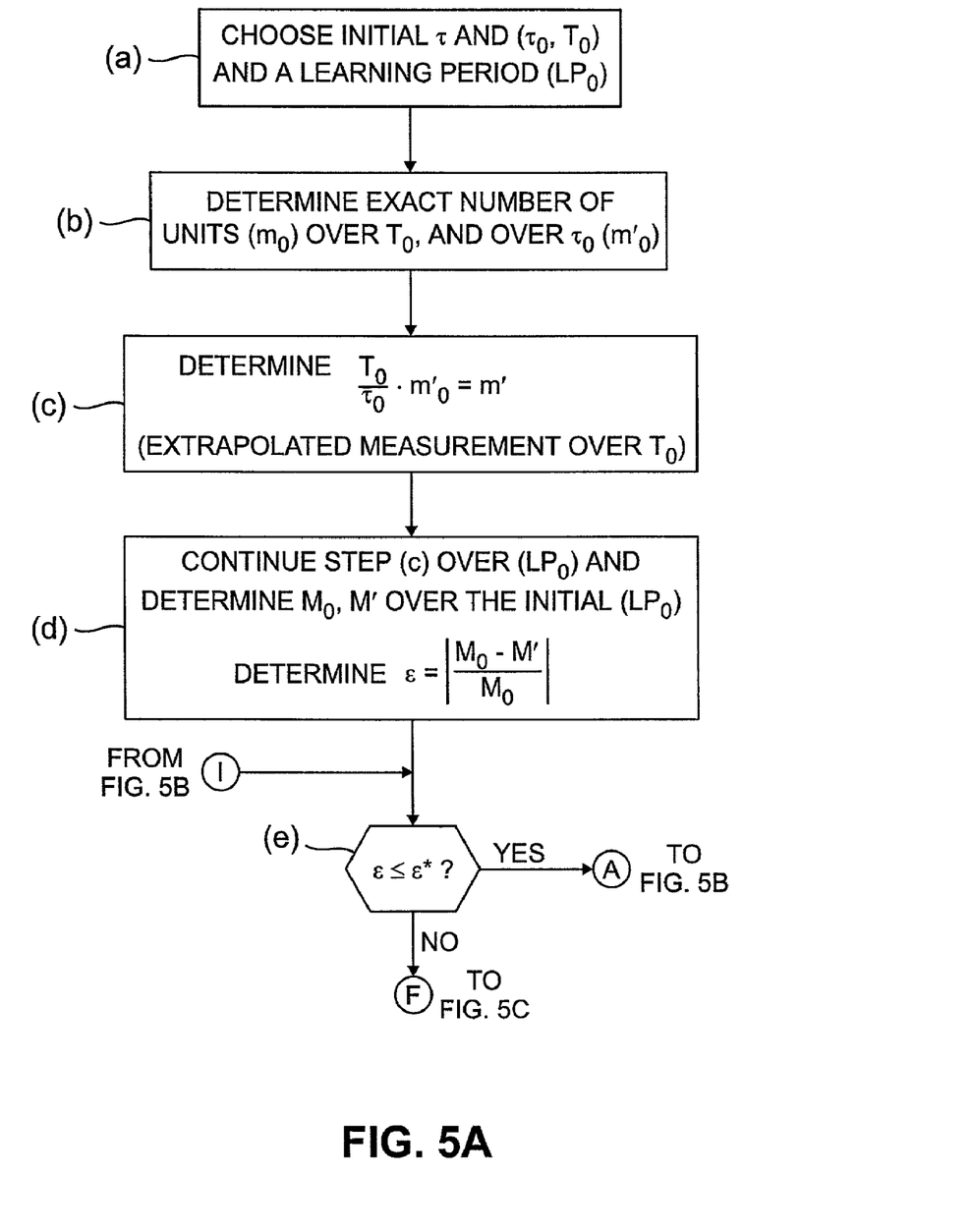
FIGS. 5A through 5D, collectively are a flow chart describing an exemplary calibration/extrapolation process that may be utilized by the multiplexer of FIG. 6, or another communications device.

FIGS. 5A through 5D illustrate one approach to the calibration and extrapolation of the values for the sampling interval, T, and the measurement window, $\tau$. As shown in FIG. 5A, during the initial learning period, $LP_0$, an initial value for the sampling interval, $T_0$, and the measurement window, $\tau_0$, are selected during step (a). Thereafter, the exact number of units, $m_0$, are measured over the sampling interval, $T_0$, and the measurement window, $\tau_0$, during step (b). The total number of packets, m', over the sampling interval, T, is extrapolated from the number of units, $m_0$, measured during the initial measurement window, $\tau_0$, during step (c) using the expression:

$$m' = \frac{T_0}{\tau_0} \times m_0 \qquad \text{Eq. (2)}$$

Step (c) is repeated for each sampling interval, T, in the initial learning period, LP. After the initial learning period, LP, is complete, the error, $\epsilon$, is obtained during step (d) using the expression:

$$\varepsilon = \left| \frac{M^0 - M'}{M^0} \right| \qquad \text{Eq. (3)}$$

where $M_0$ represents the actual number of units over each measurement window in the initial learning period, $LP_0$, and M' represents the total extrapolated number.

Figure 5B:
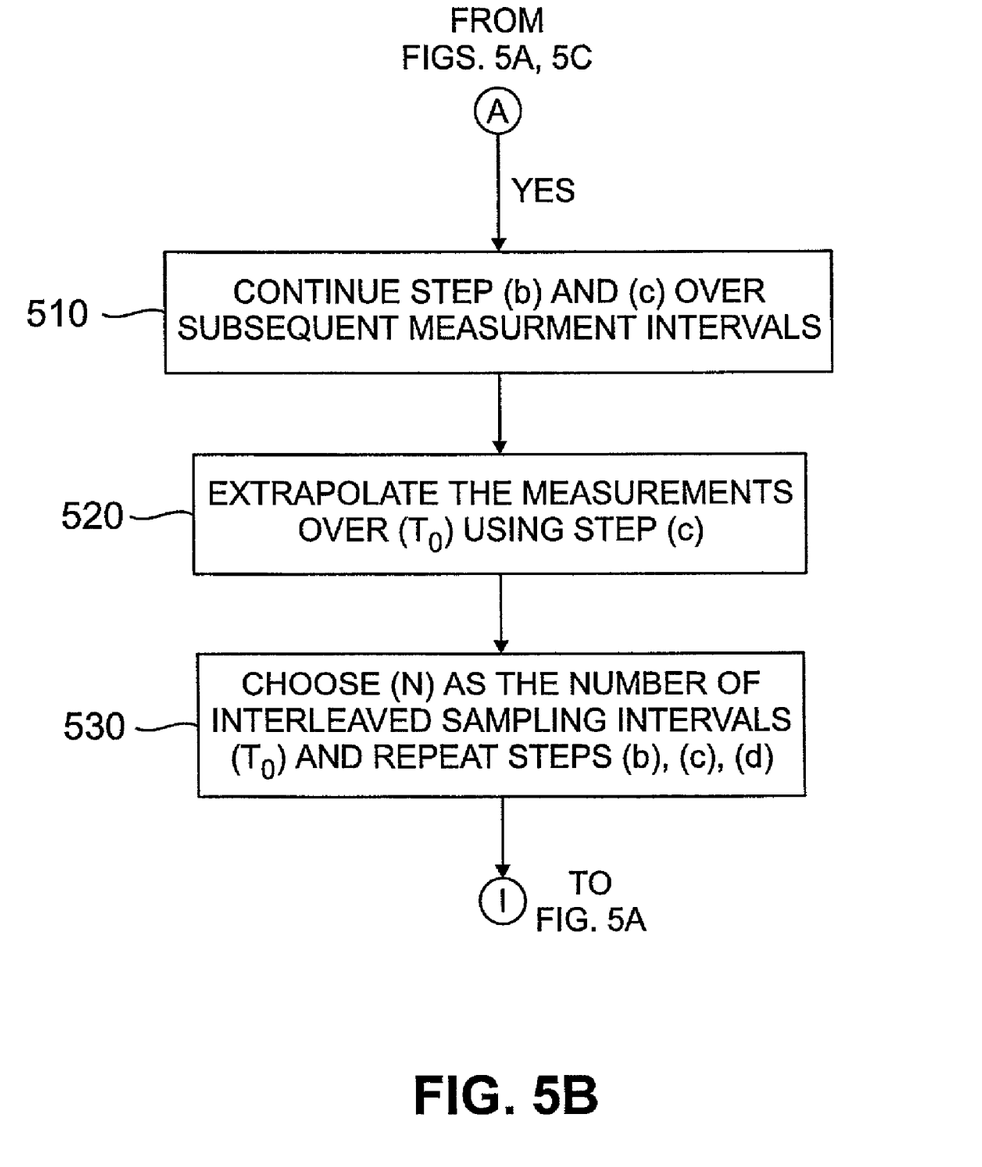

A test is then performed during step (e) to determine if the error, $\epsilon$, is less than or equal to an acceptable error in measurement, $\epsilon^*$. If it is determined during step (e) that the error, $\epsilon$, is less than or equal to an acceptable error in measurement, $\epsilon^*$, then program control proceeds to FIG. 5B. If the error, $\epsilon$, is less than or equal to an acceptable error in measurement, $\epsilon^*$, then the process of exact measurement and extrapolation during the initial learning period, $LP_0$, is halted and only extrapolation from measurements over the measurement and extrapolation periods, MEPs, continue. As shown in FIG. 5B, the calibration and extrapolation process will continue steps (b) and (c) during step 510 over subsequent measurement windows, $\tau$. Thereafter, the values measured during the measurement window, $\tau$, are extrapolated over the sampling interval, T, during step 520 using step (c). Finally, N is selected as the number of interleaved sampling intervals, T, during step 530, and steps (b), (c), and (d) are repeated, before program control returns to step (e), where N is the length (size) of the MEP interval.

Figure 5C:
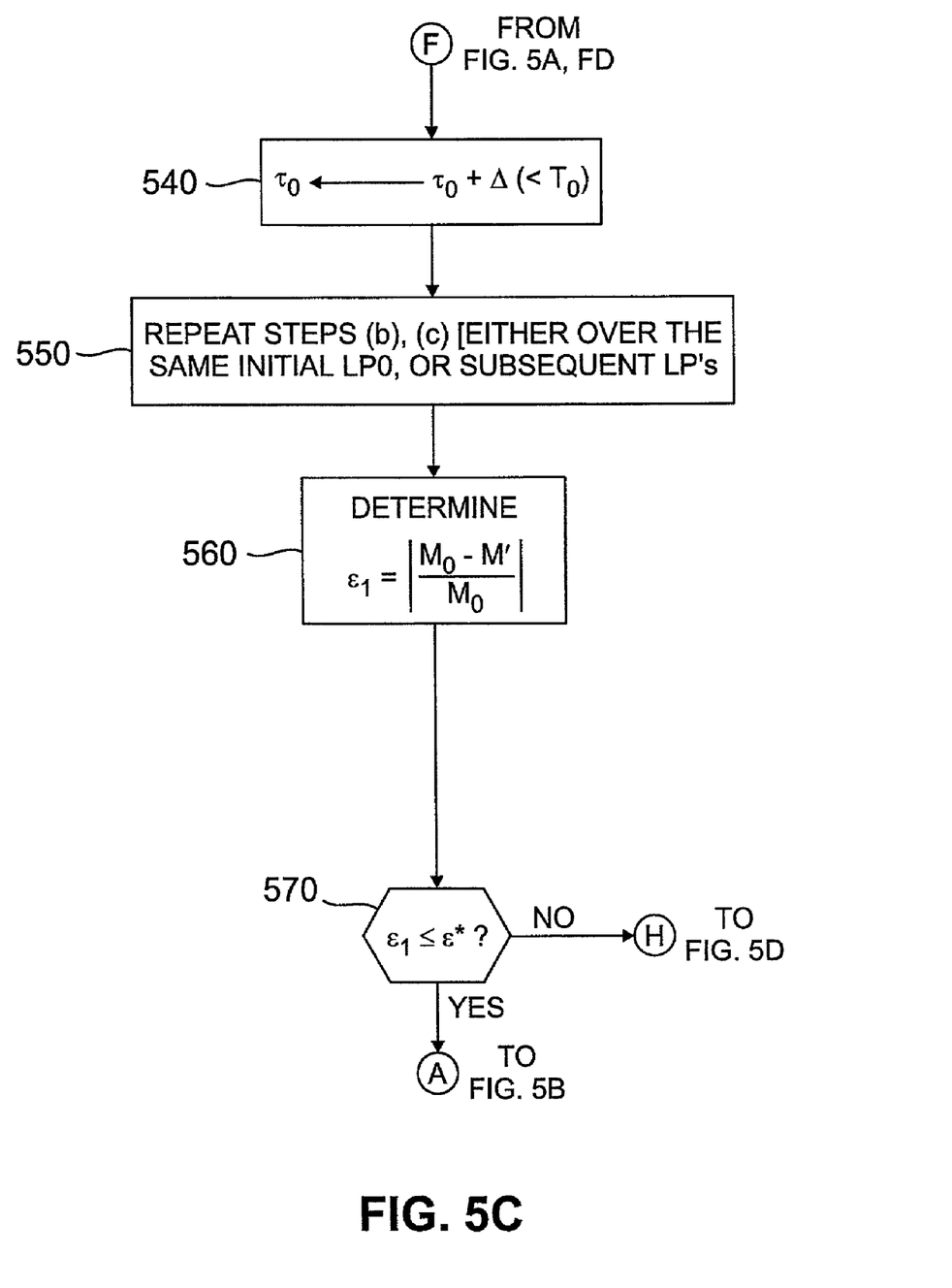

If, however, it is determined during step (e) (FIG. 5A) that the error, $\epsilon$, is not less than or equal to an acceptable error in measurement, $\epsilon^*$, then program control proceeds to FIG. 5C, where the measurement window, $\tau$, is initially increased. Thus, as shown in FIG. 5C, the initial measurement window, $\tau_0$, is increased during step 540 by an amount that is less than the initial sampling interval, $T_0$. Thereafter, steps (b) and (c) are repeated during step 550, either over the initial learning period, $LP_0$, or subsequent learning periods, LPs. The error, $\epsilon_1$, is then recalculated during step 560.

A further test is then performed during step 570 to determine if the error, $\epsilon_1$, is now less than or equal to an acceptable error in measurement, $\epsilon^*$. If it is determined during step 570 that the error, $\epsilon_1$, is less than or equal to an acceptable error in measurement, $\epsilon^*$, then program control returns to FIG. 5B, and continues in the manner described above. If, however, it is determined during step 570 that the error, $\epsilon_1$, is not less than or equal to an acceptable error in measurement, $\epsilon^*$, then program control proceeds to FIG. 5D, where the initial sampling interval, $T_0$, is now reduced.

Figure 5D:
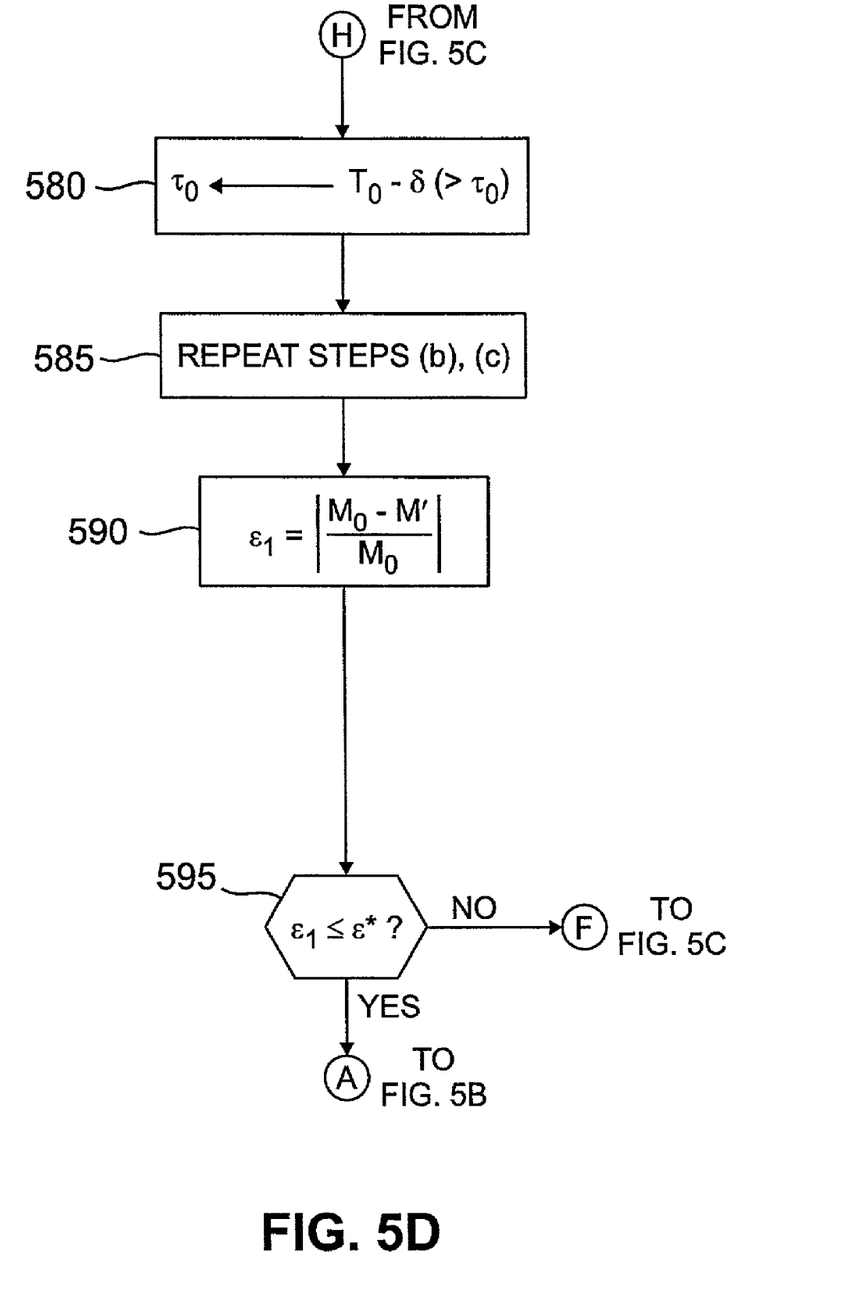

As shown in FIG. 5D, the initial sampling interval, $T_0$, is decreased during step 580 by an amount that is greater than the initial measurement window, $\tau_0$. Thereafter, steps (b) and (c) are repeated during step 585, either over the initial learning period, $LP_0$, or subsequent learning periods, LPs. The error, $\epsilon_1$, is then recalculated during step 590.

A further test is then performed during step 595 to determine if the error, $\epsilon_1$, is now less than or equal to an acceptable error in measurement, $\epsilon^*$. If it is determined during step 595 that the error, $\epsilon_1$, is less than or equal to an acceptable error in measurement, $\epsilon^*$, then program control returns to FIG. 5B, and continues in the manner described above. If, however, it is determined during step 595 that the error, $\epsilon_1$, is not less than or equal to an acceptable error in measurement, $\epsilon^*$, then program control returns to FIG. 5C, and continues in the manner described above.

These calibrations take place over the initial learning period, $LP_0$. The calibration process continues until suitable values for the initial sampling interval, $T_0$, and the initial measurement window, $\tau_0$, are determined. After determining the initial sampling interval, $T_0$, and the initial measurement window, $\tau_0$, the measurement and extrapolation period, MEP, interval commences. Periodically, such as once for each measurement and extrapolation period, MEP, the learning period, LP, operation can be repeated to recalibrate the initial sampling interval, $T_0$, and the initial measurement window, $\tau_0$, values. This recalibration is required in order to respond with appropriate sampling interval, T, and measurement window, $\tau$, values to non-stationarity and other fluctuations in the traffic.

Figure 6:
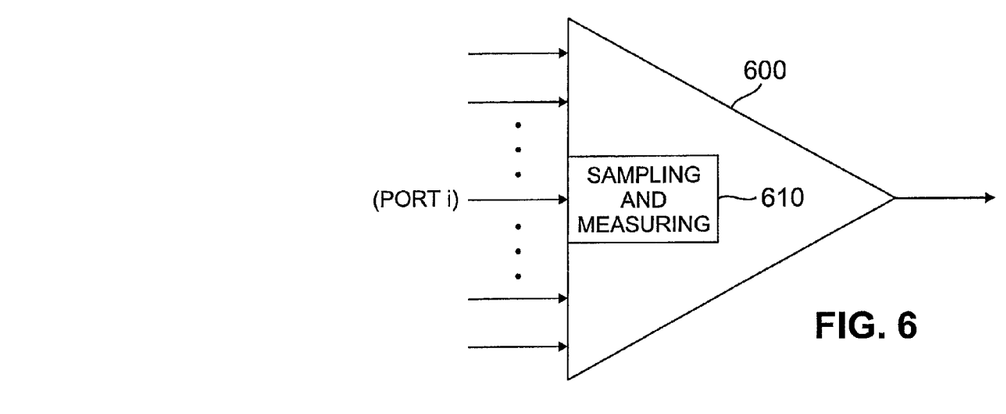
FIG. 6 illustrates a representative multiplexer in accordance with the present invention.

The resource measurement process for pricing, associated with the present invention, can be implemented in each port of a communication router, switch, or multiplexer. FIG. 6 illustrates a multiplexer 600 containing a sampling and measurement module 610 in accordance with the present invention. The sampling and measurement module 610 measures the number of packets exchanged, for example, at port i. For simplicity, it is assumed that the process of measurement is performed at the input port of the multiplexer 600. At each port, there is either a number of connection-oriented sessions or packets are transported in a datagram mode where the communication is connectionless. It is also possible that a mix of connectionless and connection-oriented flows are carried at the same port i. In the following, it is assumed that all packets belong to a different flow in a datagram mode. The case of connection oriented sessions is a subset of the datagram case and follows the same approach.

Figure 7:
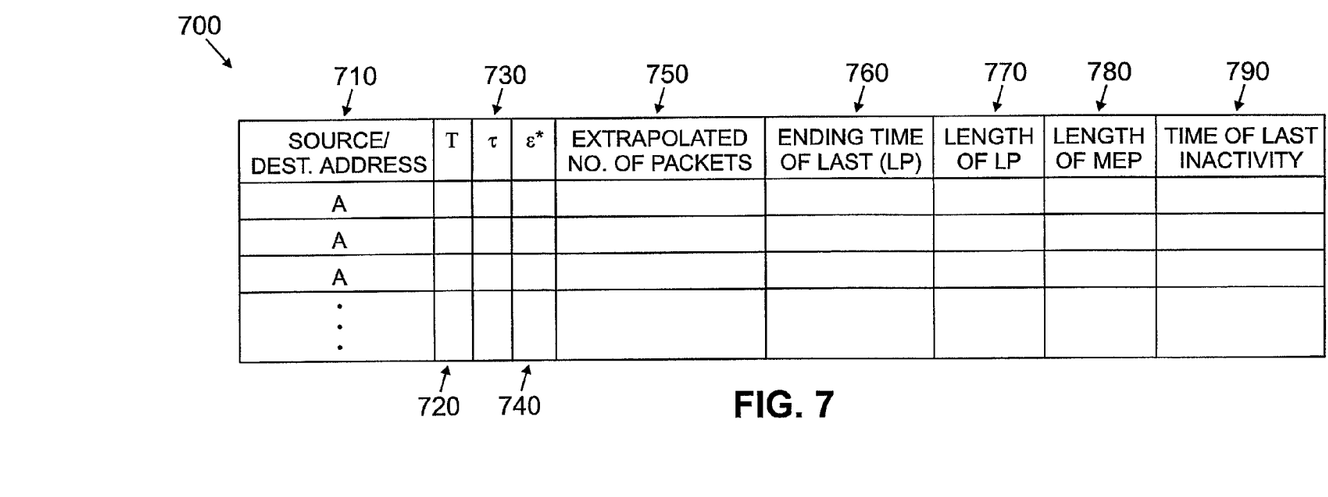
FIG. 7 is a table for recording the parameters utilized by the calibration/extrapolation process of FIGS. 5A through 5D in the representative multiplexer of FIG. 6.

During each learning period, LP, packets from all flows at port i are examined. Based on the source and destination addresses (either one or both) of each packet, an array such as the table 700 shown in FIG. 7 is created. The source and destination addresses is such that at port i, individual packets belonging to a particular flow can be uniquely identified. In the case of connection oriented sessions, for example, this identification mechanism would use the connection identification field of packets such as the virtual program identifier/virtual channel identifier (VPI/VCI) in an ATM network. During each learning period, LP, an entry is created in the table 700 of FIG. 7 for each unique packet flow (identified field 710), if the entry does not already exist. For each entry in the table 700, the process of calibration/extrapolation 500 (FIGS. 5A through 5D) is performed. It is noted that packets belonging to a new packet flow are generated after a given learning period, LP, and will be captured in the next learning period, LP. The table 700 also records the values of the sampling interval, T, the measurement window, $\tau$, and the error, $\epsilon$, in fields 720 through 730, respectively. In addition, the table 700 records the extrapolated number of packets and the ending time of the last LP period in fields 750 and 760, respectively. The entry in field 760 is useful in determining the start time of the next LP. If for each entry, a different LP length is used, that value will also be listed in field 770 of table 700. Finally, the length of the measurement and extrapolation period, MEP, is listed in field 780. The parameters recorded in fields 760 through 780 records the parameters needed in the calibration algorithm 500 of FIGS. 5A through 5D and can be updated, and modified.

It is noted that entries in table 700 corresponding to discontinued sessions should be removed and replaced with entries for new packets. This is performed by capturing the last inactivity time observed during the measurement window. The time of a measurement window with zero packets in a given sampling interval is recorded in field 790. If the subsequent measurement window contains non-zero packets then the entry in this column will be erased. However, as long as zero packet measurement windows are encountered, the last entry in the table will remain as is. If the value in this table compared to the current time exceeds a threshold (which depends on the type of application and session, such as minutes for voice, and minutes or hours for video) then the packet counts are reported to a billing center where such information is used for pricing and the packet entry is removed from the table 700.

It is to be understood that the embodiments and variations shown and described herein are merely illustrative of the principles of this invention and that various modifications may be implemented by those skilled in the art without departing from the scope and spirit of the invention.

We claim:

1. A method for measuring the usage of a communications network, said method comprising the steps of:
   selecting a sampling interval, T, and a measurement window, $\tau$;
   measuring the units of information transmitted across said communications network during said measurement window, $\tau$, for a given connection, wherein said units of information transmitted across said communications network is a multiple of a byte of information; and
   extrapolating said measured units of information to estimate the usage of said communications network for said connection over said sampling interval, T.

2. The method of claim 1, further comprising the step of recalibrating said sampling interval, T, and said measurement window, $\tau$.

3. The method of claim 2, wherein said step of recalibrating is based on an error metric that compares said estimated usage to a measured value.

4. The method of claim 3, wherein said error metric is reduced by increasing the measurement window, $\tau$.

5. The method of claim 3, wherein said error metric is reduced by decreasing the initial sampling interval, $T_0$.

6. The method of claim 1, wherein said communications network is monitored for a learning period to establish said sampling interval, T, and said measurement window, $\tau$.

7. The method of claim 6, wherein said measuring and extrapolating steps are performed during a measuring and extrapolation period initiated after said learning period establishes said sampling interval, T, and said measurement window, $\tau$.

8. The method of claim 6, further comprising the step of periodically initiating said learning period to reestablish said sampling interval, T, and said measurement window, $\tau$.

9. The method of claim 7, wherein a plurality of said learning periods are interleaved with said measurement and extrapolation periods.

10. A system for measuring the usage of a communications network, said system comprising:
    a memory for storing computer readable code;
    a processor operatively coupled to said memory, said processor configured to:
    establish a sampling interval, T, and a measurement window, $\tau$;
    measure the units of information transmitted across said communications network during said measurement window, $\tau$, for a given connection, wherein said units of information transmitted across said communications network is a multiple of a byte of information; and
    extrapolate said measured units of information to estimate the usage of said communications network for said connection over said sampling interval, T.

11. The system of claim 10, wherein said processor is further configured to recalibrate said sampling interval, T, and said measurement window, $\tau$.

12. The system of claim 11, wherein said recalibration is based on an error metric that compares said estimated usage to a measured value.

13. The system of claim 12, wherein said error metric is reduced by increasing the measurement window, $\tau$.

14. The system of claim 12, wherein said error metric is reduced by decreasing the initial sampling interval, $T_0$.

15. The system of claim 10, wherein said processor monitors said communications network for a learning period to establish said sampling interval, T, and said measurement window, $\tau$.

16. The system of claim 15, wherein said measurement and extrapolation are performed during a measuring and extrapolation period initiated after said learning period establishes said sampling interval, T, and said measurement window, $\tau$.

17. The system of claim 15, wherein said processor is further configured to periodically initiate said learning period to reestablish said sampling interval, T, and said measurement window, $\tau$.

18. The system of claim 16, wherein a plurality of said learning periods are interleaved with said measurement and extrapolation periods.

19. An article of manufacture comprising:
a computer readable medium having computer readable code means embodied thereon, said computer readable program code means comprising:
a step to establish a sampling interval, T, and a measurement window, $\tau$;
a step to measure the units of information transmitted across said communications network during said measurement window, $\tau$, for a given connection, wherein said units of information transmitted across said communications network is a multiple of a byte of information; and
a step to extrapolate said measured units of information to estimate the usage of said communications network for said connection over said sampling interval, T.

* * * * *